United States Patent [19]
von Blanquet

[11] Patent Number: 5,127,236
[45] Date of Patent: Jul. 7, 1992

[54] SYSTEM AND APPARATUS FOR THE MANUFACTURE OF CLEAR ICE PIECES AND CONTROL SYSTEM THEREFOR

[75] Inventor: Georg von Blanquet, Baden-Baden, Fed. Rep. of Germany

[73] Assignee: Gaggenau-Werke Haus- und Lufttechnik GmbH, Gaggenau, Fed. Rep. of Germany

[21] Appl. No.: 678,152

[22] Filed: Apr. 2, 1991

[30] Foreign Application Priority Data

Apr. 14, 1990 [DE] Fed. Rep. of Germany ....... 4012249

[51] Int. Cl.⁵ ................................................. F25C 5/08
[52] U.S. Cl. ............................................ 62/135; 62/351
[58] Field of Search ................... 62/73, 351, 352, 353, 62/135

[56] References Cited

U.S. PATENT DOCUMENTS

| | | | |
|---|---|---|---|
| 2,900,804 | 8/1959 | Rising | 62/352 X |
| 2,954,679 | 10/1960 | Blackett | 62/353 X |
| 3,287,927 | 11/1966 | Jacobus | 62/135 |
| 3,380,261 | 4/1968 | Hendrix et al. | 62/353 X |
| 3,433,030 | 3/1969 | Jacobs | 62/351 X |
| 4,199,956 | 4/1980 | Lunde | 62/352 X |
| 4,366,856 | 1/1983 | Yanadori et al. | 62/351 X |

FOREIGN PATENT DOCUMENTS

| | | |
|---|---|---|
| 0333887 | 9/1989 | European Pat. Off. |
| 3024590 | 1/1982 | Fed. Rep. of Germany |
| 3216597 | 11/1983 | Fed. Rep. of Germany |
| 3314056 | 10/1984 | Fed. Rep. of Germany |
| 8812951 | 1/1989 | Fed. Rep. of Germany |
| 3835132 | 4/1990 | Fed. Rep. of Germany |

Primary Examiner—William E. Tapolcai
Attorney, Agent, or Firm—Wenderoth, Lind & Ponack

[57] ABSTRACT

A coolant circuit, for example of a refrigerator or freezer unit, includes a coolant source at a very low temperature. A finger-type chilling member is thermo-conductively connected to the coolant source and is adapted to be positioned within a tank containing water that is flowed to wash around the member. Thereby, the water freezes on the member in the form of a clear ice piece. A heating device is connected to the member to selectively heat the member to detach therefrom the ice piece formed thereon. A thermal barrier is connected to the member at a position to separate the heating device and that portion of the member on which the ice piece is formed from the coolant source. The thermal barrier thus limits cooling of the member by the coolant source and also limits transfer of heat from the heating device to the coolant source. A control circuit includes a regulating circuit to operate the heating device to maintain the temperature of the member at an approximately constant value above a predetermined minimum value necessary to produce clear ice pieces.

37 Claims, 2 Drawing Sheets

SYSTEM AND APPARATUS FOR THE MANUFACTURE OF CLEAR ICE PIECES AND CONTROL SYSTEM THEREFOR

BACKGROUND OF THE INVENTION

The present invention relates to an apparatus for the manufacture of clear ice pieces, particularly for use with a refrigerator or freezer unit including a cooling circuit having a coolant source at a very low temperature, the apparatus including a finger-type chilling member adapted to be positioned within a tank containing water to be caused to flow to wash around the member and adapted to be thermoconductively connected to the coolant source to be cooled thereby such that the water freezes on the member in the form of a clear ice piece, and a heating device operatively connected to the member to selectively heat the member to detach therefrom an ice piece formed thereon. The present invention also relates to a system for manufacturing clear ice pieces, such system including a refrigerator or freezer unit including a cooling circuit having an evaporator and a coolant source at a very low temperature, as well as one or more of the above discussed apparatus. Yet further, the present invention relates to a control system for controlling the temperature of the finger-type chilling member of such an apparatus.

German Registered Utility Model No. 88 12 951 and German Patent Specification No. 38 35 132 describe a device for the manufacture of clear ice pieces, wherein a water flow is generated such that water moves back and forth within a tank, such tank being moved by a swinging drive mechanism whereby the water flow washes about finger-type chilling devices which project into the tank. Such chilling devices are thermoconductively connected to a refrigerant line of a cooling device, such that ice pieces freeze and are formed on the chilling devices. In this known device, the ice formation is achieved specifically from the finger-type chilling devices. A tilting tank with a residual water storage container is disclosed in German Patent Specification No. 32 16 597. Also, the detachment of the hollow ice pieces frozen tightly to such finger-type chilling devices is known to be achieved by heating the finger-type chilling devices. Heating of ice pieces formed in individual compartments of a tank to detach them after completion of the freezing process is disclosed in European Patent Specification No. 0 333 887.

German Patent Specification No. 33 14 056 discloses a freezer unit, particularly a freezer cabinet, in which an evaporation system or evaporator is subdivided into at least two evaporation sections allocated to respective thermally separated compartments of the cabinet. At least one of these evaporation sections can be bridged by a controllable bypass feeder, and an additional evaporator is allocated to the bridged evaporation section, the effective surface of such additional evaporator being substantially less than that of the bridged evaporation section. This arrangement is intended to compensate for disadvantages that arise due to fluctuating load status and unit capacity factor by economical adjustment of the evaporation output to the load status. Switching is effected by three-way solenoid valves. Switching of refrigerant flow between two evaporators; each of which is individually connected, is disclosed in German Patent Specification No. 30 24 590. Therein is disclosed a domestic refrigerator or freezer unit in which, in addition to a compartment for storing refrigerated products, there is an additional section for preparing chilled drinking water. One evaporator is allocated to the refrigerated products compartment and the other evaporator is allocated to the additional section for storing chilled drinking water.

SUMMARY OF THE INVENTION

With the above discussion in mind, it is an object of the present invention to provide an apparatus and system for the manufacture of clear ice pieces, and including a cooling circuit of a refrigerator or freezer unit, or particularly for use with such a refrigerator or freezer unit including a cooling circuit, whereby it is possible to produce perfect, clear ice pieces with only minor additional refrigerant consumption. It also is an object of the present invention to provide a control system for use with such an apparatus and system.

The above objects are achieved in accordance with the present invention by the provision of a thermal barrier provided at a position to separate a finger-type chilling member and a heating device from the coolant source, for example a refrigerant line. This arrangement provides the advantage that the finger-type chilling member or members are not excessively cooled by direct thermal contact with the coolant source, for example the refrigerant line that contains refrigerant that may be at a very low temperature, for example as low as $-30°$ C. As a result, the thermal barrier makes it possible to ensure that the surface temperature of the finger-type chilling members does not fall below a predetermined lower temperature limit. For example, it is possible to ensure that the surface temperature of the finger-type chilling members does not fall below approximately $-10°$ C., which is a favorable temperature for the manufacture of clear ice particles. Furthermore, to maintain this lower temperature limit, for example by heating the finger-type chilling members, the provision of the thermal barrier limits the transfer of heat from the heating device back to the coolant source. That is, heat from the heating device is isolated from the coolant source, thereby avoiding lowering of the refrigerating effect of the coolant source.

As employed herein, the term "thermal barrier" is intended to refer to one-piece or composite arrangements, for example of thermal insulation material, that reduce thermal transfer between the coolant source and the section of the finger-type chilling members on which the ice pieces are formed. In a specific example of the present invention, the coolant source will be a refrigerant line fed with refrigerant at very low temperatures. However, other coolant sources may be employed, for example a coolant source of solid metal that is connected to a refrigerating apparatus or unit of any known type.

As employed herein the term "finger-type chilling member" refers to a structure, element or member that is of or includes an elongated configuration and having a suitable outer surface on which may freeze water to form clear ice pieces. In accordance with a particular embodiment of the present invention, such finger-type chilling member includes a projecting (or connecting) section, for example formed of thermally conductive metal, that is thermally connected to the coolant source, as well as a finger section on which is to be formed an ice piece, with the thermal barrier positioned between the projecting section and the finger section. The thermal barrier is formed of material having poor thermal conductive properties. This thermal barrier thus reduces thermal transfer from the coolant source to the freezing section, i.e. the finger section, of the member, on the one hand, and, on the other hand, undesirable heat feedback to the coolant source is substantially restricted when the finger section is heated by the heating device to remove a frozen ice piece from the finger section, or for other purposes. Both the projecting section and the finger section may be formed of suitable thermally conductive materials, for example metal materials. The projecting and finger sections may be coupled together by a connection (or coupling) member, for example a screw connection formed of material having poor thermoconductive properties. Such screw connection may be in the form of a grub screw, for example. Also, the thermal barrier may include a washer-shaped member extending outwardly from between the projecting and finger sections of the member. Such insulating washer may be formed of various materials having poor thermally conductive properties, for example thermal insulating material. Examples may be metal materials, particularly special steels, or various plastic materials.

In accordance with a further feature of this embodiment of the invention, the insulating washer may be designed as an attachment or support element for the heating device that is employed to selectively heat the finger section of the chilling member. Thus, the heating device may be retained in a support member that is connected to the washer member. Particularly, the support member may have retaining or locating portions that engage in recesses or openings in the washer member. The support member particularly may be pot-shaped and/or may be formed of thermally insulating material. The heating device, for example an electrical heating coil, can be retained within the support member and thus supported by the washer member.

In accordance with a further feature of the present invention the coolant source in the form of a refrigerant line optionally can be connected in series to an evaporator of the cooling circuit of the refrigerator or freezer unit, particularly a domestic refrigerator, during the operation of manufacture or production of clear ice pieces. This selective connector arrangement dispenses with the need for additional compressor cooling structure and simply makes additional use of the existing compressor of the cooling circuit during production of clear ice pieces. In such an arrangement it is advisable to provide a three-way valve, particularly in the form of a solenoid valve, for optional or selective connection of the refrigerant line into the refrigeration or cooling circuit of the refrigerator unit. This arrangement provides advantageous additional use of the existing refrigerant or cooling circuit during the manufacture of ice. The cooling circuit of the domestic refrigerator, which may have a freezer section, is subjected to an additional load only during manufacture of ice pieces, simply by switching the refrigerant line that forms the coolant source for the apparatus of the invention into the cooling circuit when needed. It is useful if the refrigerant line can be connected in series to the evaporator of the cooling circuit of the refrigerator or freezer unit in the direction of flow of the refrigerant therethrough.

In accordance with a further feature of the present invention, there is provided a temperature sensor, for example an electrical temperature sensor, for detecting the temperature of the finger section of the chilling member. Furthermore, there is provided a control circuit, connected to the temperature sensor and to the heating device, particularly an electrical heating device, for controlling the operation of the heating device as a function of the temperature of the finger section detected by the temperature sensor. Particularly, the control circuit includes means for operating the heating device to maintain the temperature of the finger section at an approximately constant temperature value above a predetermined minimum temperature value necessary to produce clear ice pieces. For example, such predetermined minimum temperature value may be $-10°$ C. This may be achieved in the form of a regulating circuit controlling operation of the electrical heating device to maintain the temperature of the finger section of the chilling member, i.e. the portion of the chilling member isolated from the coolant source by the thermal barrier, above the predetermined minimum temperature. In other words, it is possible to ensure that the temperature of the finger section does not drop below the predetermined minimum value that would degrade the quality and clarity of ice pieces formed. The regulating circuit includes the electrical temperature sensor that is thermally connected to the finger section, and advantageously would operate employing a clock system by switching the electrical heating device on and off. This type of regulating circuit for maintaining a constant temperature, as a function of signals from a temperature sensor, for example an NTC/PTC, is well known in various environments. Thus, one skilled in the art readily would understand what type of known elements could be employed for the regulating circuit of the present invention.

As a result of the above features of the present invention, it is possible to ensure the accurate manufacture of perfect clear ice pieces, particularly on a domestic scale, with optimum utilization of the cooling output already available, for example a compressor cooling unit, and without the danger of excessively low temperatures being imparted to the finger-type chilling members that otherwise would cause micro-cracking and therefore clouding of the ice pieces.

BRIEF DESCRIPTION OF THE DRAWINGS

Other objects, features and advantages will be apparent from the following detailed description, taken with the accompanying drawings, wherein.

DETAILED DESCRIPTION OF THE INVENTION

Figure 1:
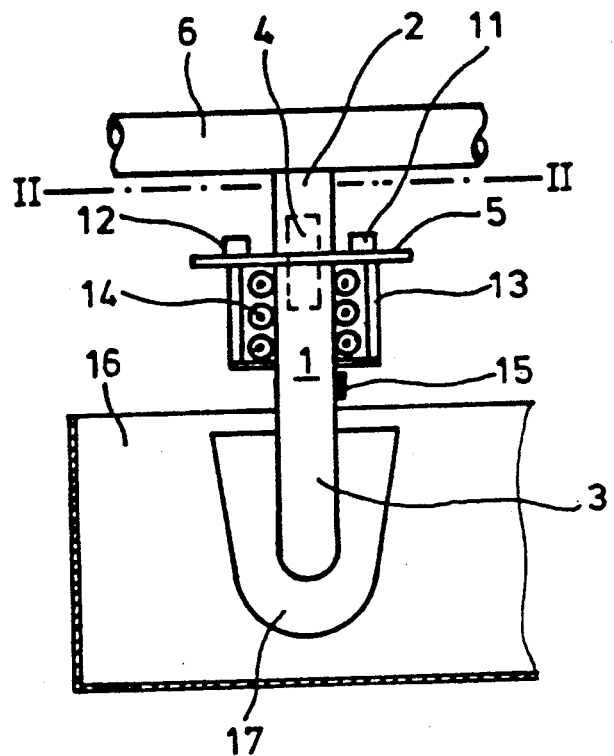
FIG. 1 is a partial cross sectional view illustrating a finger-type chilling member employed in an apparatus according to an embodiment of the present invention.
Figure 2:
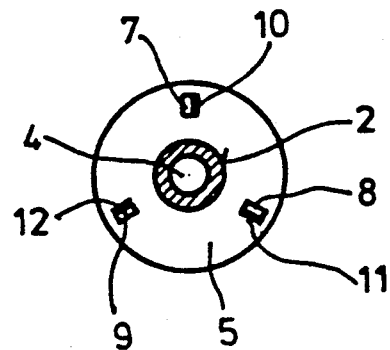
FIG. 2 is a sectional view along line II—II in FIG. 1.

In FIGS. 1 and 2 is shown a finger-type chilling member 1 formed of a metal, thermally conductive projecting (or connecting) section 2 and a metal, thermally conductive finger section 3. Projecting section 2 is thermoconductively connected, for example by means of a metallic bond, to a coolant source, for example a refrigerant line 6 containing refrigerant at a very low temperature, and to be discussed in more detail below. Sections 2 and 3 are connected together but are separated by a thermal barrier. Particularly, sections 2, 3 are connected by a connection (or coupling) member 4, for example a grub screw, formed of a material, for example a special steel, having poor thermoconductive properties. Additionally, an insulating washer-shaped member 5, also formed of a material such as a special steel having poor thermoconductive properties extends outwardly from the joint between sections 2, 3. As a result, sections 2, 3 are separated by thermal barrier 4, 5.

Finger section 3 is positioned within a tank 16 containing water to be flowed to wash around section 3 and cooled thereby such that the water freezes on section 3 in the form of a clear ice piece 17. A heating device, for example an electrical heating coil 14, is operatively connected to section 3 so that section 3 may be selectively heated to detach therefrom ice piece 17 after formation thereof. Tank 16 and other features of the ice-forming system may be in accordance with the above German Registered Utility Model No. 88 12 951.

In the illustrated arrangement, heating coil 14 is supported by washer 5. Particularly, a pot-shaped support member 13 formed of a thermally insulating material, for example plastic, has three symmetrically arranged locating portions or catches 10, 11, 12 that fit into and engage in respective recesses or openings 7, 8, 9 of insulating washer 5. Electrical heating coil 14 is accommodated within support member 13.

There additionally is provided a temperature sensor 15, for example an electrical temperature sensor, for detecting the temperature of finger section 3. A plurality of the units shown in FIGS. 1 and 2 may be positioned within tank 16 to form a plurality of clear ice pieces 17.

Figure 3:
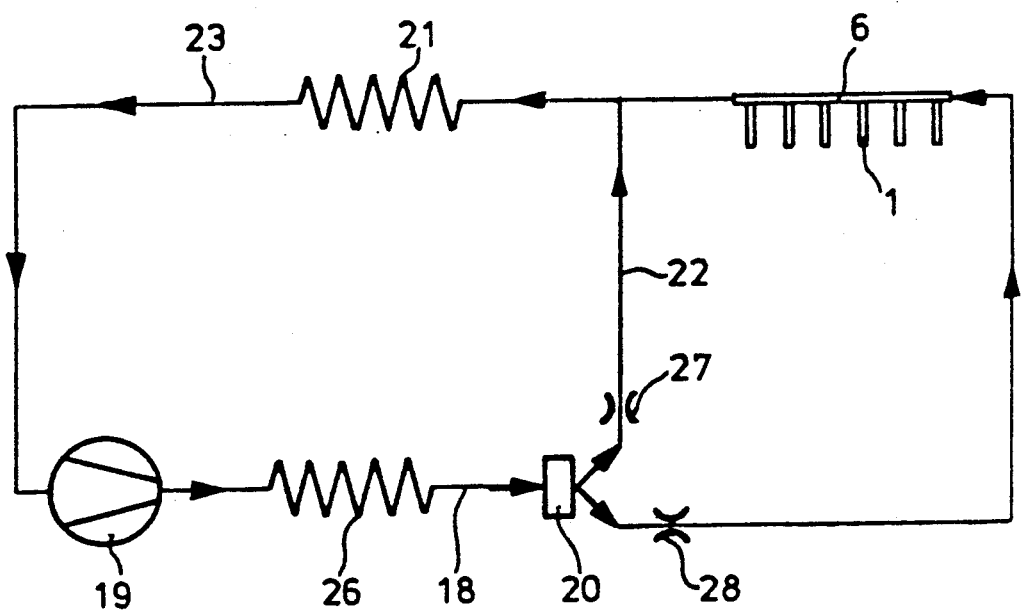
FIG. 3 is a diagram of a system according to the invention and including a cooling circuit of a domestic refrigerator coupled with an apparatus for the manufacture of clear ice pieces according to the present invention.

FIG. 3 illustrates a system according to the present invention and including a refrigerant or cooling circuit of a domestic refrigerator. The circuit includes a compressor 19, a condensor 26, a line 18, 22, a main evaporator 21, and a return line 23. As shown in FIG. 3, the coolant source in the form of refrigerating line 6 thermally connected to a plurality of members 1 for forming clear ice pieces may be connected to such cooling circuit. Particularly, a three-way solenoid valve 20 is connected to line 18 whereby it is possible to selectively connect line 18 through valve 20 to refrigerant line 6. Particularly, refrigerant flows from line 18 through valve 20 and a throttle 28 through coolant line 6 in series with main evaporator 21. This connection is employed when production of clear ice pieces is to occur. When ice pieces are not being produced, valve 20 connects line 18 with line 22 such that the refrigerant flow is from line 18 through valve 20 and a throttle 27 directly to main evaporator 21. When refrigerant line 6 is connected into the cooling circuit, such connection should be in series with main evaporator 21, which may if appropriate be formed of plural parts, for example for freezer and normal cooling compartments or sections of the domestic refrigerator.

Figure 4:
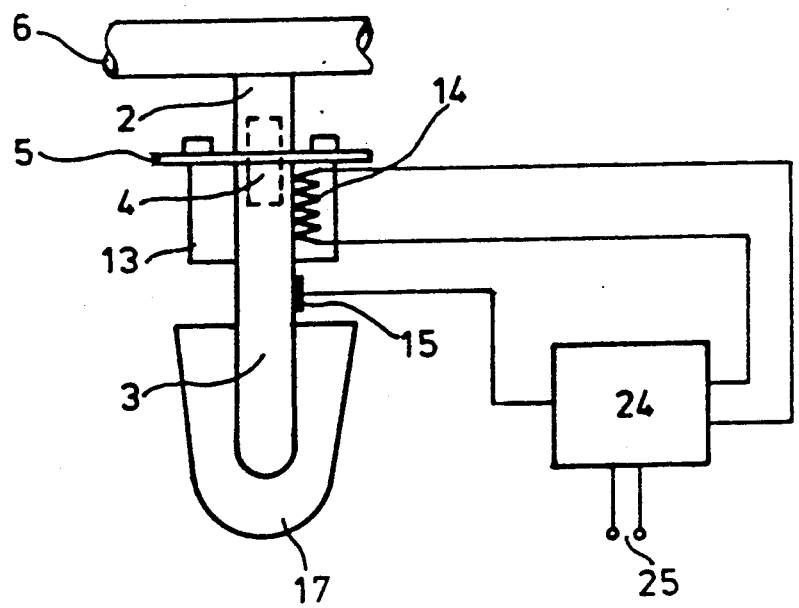
FIG. 4 is a view similar to FIG. 1 but also schematically illustrating a circuit diagram of a control system according to the present invention.

FIG. 4 illustrates a further aspect of the present invention. Particularly, a control circuit 24 is electrically connected to heater device 14 and to temperature sensor 15. Control circuit 24 thereby controls the operation of heating device 14 as a function of signals received from temperature sensor 15 relating to the temperature of finger section 3. As a result, a simple, two-step control system is provided, with power supply to control circuit 24 being achieved via terminals 25. Once the clear ice pieces 17 on finger sections 3 have reached a suitable thickness, for example ascertained by a mechanical or other scanning sensor element, electrical heating coils 14 are switched on by control circuit 24 until the clear ice pieces 17 are detached from finger sections 3 as a result of sufficient heating of sections 3 by heating coils 14. The clear ice pieces thus drop into a collection tank for further storage or processing. Furthermore, control circuit 24 may include a regulating circuit to operate electrical heating coils 14 to maintain the temperature of finger sections 3 at an approximately constant temperature value above a predetermined minimum temperature value, for example −10° C., necessary to produce clear ice pieces. That is, signals from temperature sensor 15 will cause the regulating circuit of control circuit 24 to operate heating coil 14 when the temperature of finger section 3 drops below the predetermined minimum temperature value. This ensures that the temperature of finger section 3 will not drop to an extent such that the ice pieces formed will be cracked, cloudy or otherwise degraded.

The provision of the thermal barrier 4, 5 facilitates maintaining the temperature of finger section 3 at the predetermined minimum temperature value. That is, thermal barrier 4, 5 limits the cooling of finger section 3 by coolant source 6. Additionally, thermal barrier 4, 5 limits heat being transferred to coolant source 6 upon operation of heating coil 14.

The apparatus for the production of clear ice pieces according to the present invention can be manufactured either as a separate unit or, particularly-usefully in connection with refrigerator or freezer units, particularly domestic models, for example as a built-in component of a domestic refrigerator.

Although the present invention has been described and illustrated with respect to preferred features thereof, it is to be understood that various changes and modifications may be made to the specifically described and illustrated features without departing from the scope of the present invention.

I claim:
1. An apparatus for the manufacture of clear ice pieces, particularly for use with a refrigerator or freezer unit including a cooling circuit having a coolant source at a very los temperature, said apparatus comprising:
 a finger-type chilling member adapted to be positioned within a tank containing water to be flowed to wash around said member and adapted to be thermoconductively connected to coolant source to be cooled thereby such that the water freezes on said member in the form of a clear ice piece, said finger-type chilling member comprising a thermally conductive connecting section adapted to be connected to the coolant source, and a thermally conductive finger section on which the clear ice piece is to be formed;
 a heating device operatively connected to said finger section to selectively heat said finger section to detach therefrom an ice piece formed thereon; and
 thermal barrier means, connected between and separating said connecting section and said finger section of said finger-type chilling member, for limiting cooling of said finger section of said finger-type chilling member by the coolant source and for limiting back transfer of heat from said heating device to the coolant source when said heating device is operated.

2. An apparatus as claimed in claim 1, wherein said finger section is formed of thermally conductive metal.

3. An apparatus as claimed in claim 1, wherein said projecting section is formed of thermally conductive metal.

4. An apparatus as claimed in claim 1, wherein said thermal barrier means is formed of material having poor thermal conductive properties.

5. An apparatus as claimed in claim 4, wherein said thermal barrier means comprises a coupling member coupling said connecting section to said finger section and a thermally insulating washer member between said connecting section and said finger section and surrounding said finger section.

6. An apparatus as claimed in claim 5, wherein said heating device is supported by said washer member.

7. An apparatus as claimed in claim 6, further comprising a support member retaining said heating device and connected to said washer member.

8. A system as claimed in claim 6, wherein
said heating device comprises an electrical heating coil surrounding said finger section of said finger-type chilling member.

9. An apparatus as claimed in claim 7, wherein said support member has locating portions engaged in recesses in said washer member.

10. An apparatus as claimed in claim 7, wherein said support member is pot-shaped and is formed of thermally insulating material.

11. An apparatus as claimed in claim 1, further comprising a temperature sensor for detecting the temperature of said finger section.

12. An apparatus as claimed in claim 11, further comprising control means, connected to said temperature sensor and to said heating device, for controlling the operation of said heating device as a function of the temperature of said finger section detected by said temperature sensor.

13. An apparatus as claimed in claim 12, wherein said control means comprises means for operating said heating device to maintain the temperature of said finger section at an approximately constant value above a predetermined minimum value necessary to produce clear ice pieces.

14. An apparatus as claimed in claim 1, wherein said heating device comprises an electrical heating device.

15. An apparatus as claimed in claim 14, wherein said heating device comprises an electrical heating coil surrounding said finger section of said finger-type chilling member.

16. A system for manufacturing clear ice pieces, said system comprising:
a cooling circuit of a refrigerator or freezer unit and including an evaporator and a coolant source at a very low temperature;
at least one finger-type chilling member thermoconductively connected to said coolant source to be cooled thereby and adapted to be positioned within a tank containing water to be flowed to wash around said at least one member, such that water freezes on said at least one member in the form of a clear ice piece, said at least one finger-type chilling member comprising a thermally conductive connecting section adapted to be connected to said coolant source, and a thermally conductive finger section on which the clear ice piece is to be formed;
at least on heating device respectively operatively connected to said finger section of said at least one finger-type chilling member to selectively heat said finger section of said at least one finger-type chilling member, respectively, to detach therefrom an ice piece formed thereon; and
at least one thermal barrier means, respectively connected between and separating said connecting section and said finger section of said at least one finger-type chilling member for respectively limiting cooling of said finger section of said at least one finger-type chilling member by said coolant source and for respectively limiting back transfer of heat from said at least one heating device to said coolant source when said at least one heating device is operated.

17. A system as claimed in claim 16, wherein said finger section of said at least one finger-type chilling member is formed of thermally conductive metal.

18. A system as claimed in claim 16, wherein said connecting section of said at least one finger-type chilling member is formed of thermally conductive metal.

19. A system as claimed in claim 16, wherein said at least one thermal barrier means is formed of material having poor thermal conductive properties.

20. A system as claimed in claim 19, wherein said at least one thermal barrier means comprises a coupling member respectively coupling said connecting section to said finger section of said at least one finger-type chilling member, and a thermally insulating washer member between said connecting section and said finger section and surrounding said finger section.

21. A system as claimed in claim 20, wherein said at least one heating device is respectively supported by said washer member of said at least one thermal barrier means.

22. A system as claimed in claim 21, further comprising at least one support member respectively retaining said at least one heating device and connected to said washer member to said at least one thermal barrier means.

23. A system as claimed in claim 21, wherein
said at least one heating device respectively comprises at least one electrical heating coil surrounding said finger section of said at least one finger-type chilling member.

24. A system as claimed in claim 23, wherein said at least one support member has locating portions engaged in recesses in said washer member of said at least one thermal barriers means, respectively.

25. A system as claimed in claim 23, wherein said at least one support member is pot-shaped and is formed of thermally insulating material.

26. A system as claimed in claim 16, further comprising a temperature sensor for detecting the temperature of said finger section of said at least one finger-type chilling member.

27. A system as claimed in claim 26, further comprising control means, connected to said temperature sensor and to said at least one heating device, for controlling the operation of said at least one heating device as a function of the temperature of said finger section of said at least one finger-type chilling member detected by said temperature sensor.

28. A system as claimed in claim 27, wherein said control means comprises means for operating said at least one heating device to maintain the temperature of said finger section of said at least one finger-type chilling member at an approximately constant value above a predetermined minimum value necessary to produce clear ice pieces.

29. A system as claimed in claim 16, wherein said at least one heating device respectively comprises at least one electrical heating device.

30. A system as claimed in claim 29, wherein said at least one heating device respectively comprises at least one electrical heating coil surrounding said finger section of said at least one finger-type chilling member.

31. A system as claimed in claim 16, wherein said coolant source comprises a refrigerant line.

32. A system as claimed in claim 31, further comprising means for selectively connecting said refrigerant line in series with said evaporator in order to manufacture the clear ice piece.

33. A system as claimed in claim 32, wherein said connecting means comprises a three-way valve provided in said cooling circuit.

34. A system as claimed in claim 32, wherein said series connection is in the direction of refrigerant flow through said cooling circuit.

35. A control system for controlling the temperature of an apparatus to be employed for the manufacture of clear ice pieces and to include a finger-type chilling member thermoconductivity connected to a coolant source of a cooling circuit of a refrigerant or freezer unit and to be positioned within a tank containing water to be flowed to wash around the member such that water freezes on the member in the form of a clear ice piece, said control system comprising:
 a heating device adapted to be operatively connected to a portion of the member that is partially thermally isolated from the coolant source;
 a temperature sensor for detecting the temperature of such member portion; and
 control means, connected to said temperature sensor and to said heating device, for operating said heating device to maintain the temperature of the member portion at an approximately constant value above a predetermined minimum value necessary to produce the clear ice pieces.

36. A control system as claimed in claim 35, wherein said heating device comprises an electrical heating device.

37. A control system as claimed in claim 36, wherein said heating device comprises an electrical heating coil adapted to surround the member portion.

* * * * *